July 7, 1970   E. C. ARZIG ET AL   3,519,113
PARKING METER WITH TOKEN DISPENSING MEANS
Filed Jan. 11, 1968   6 Sheets-Sheet 1

INVENTORS
Edward C. Arzig
Rinaldo Sciacero
by McDougall, Hersh, Scott and Ladd
Att'ys

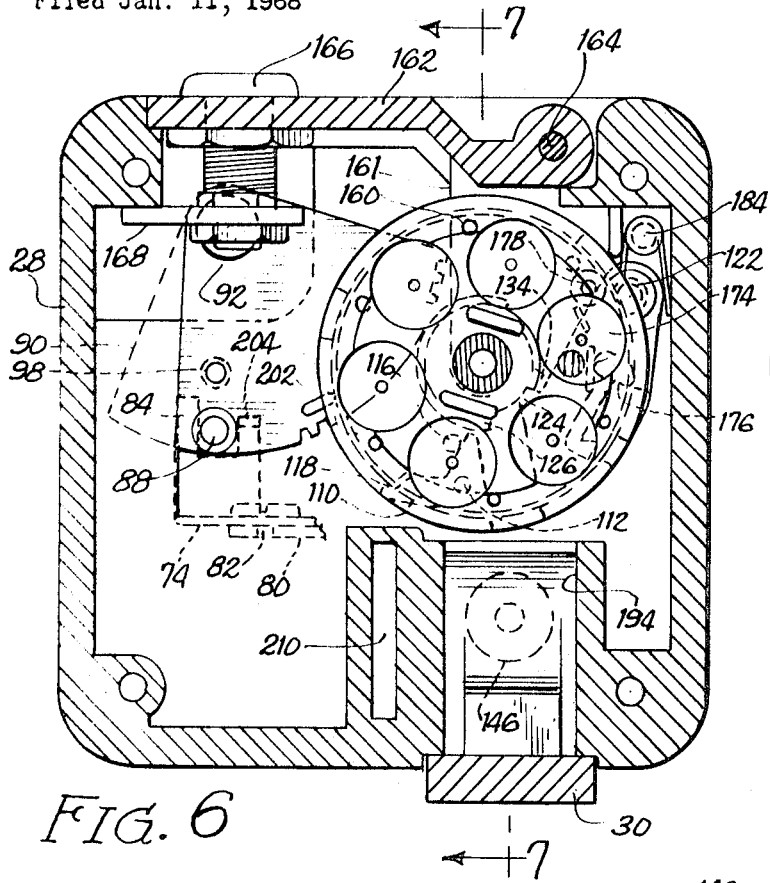
FIG. 6
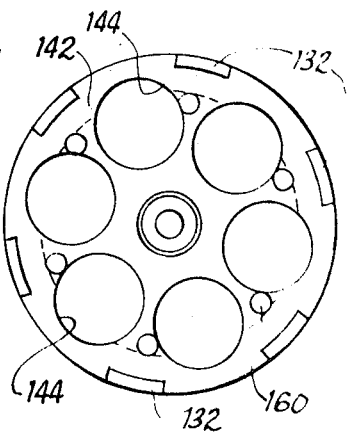
FIG. 8
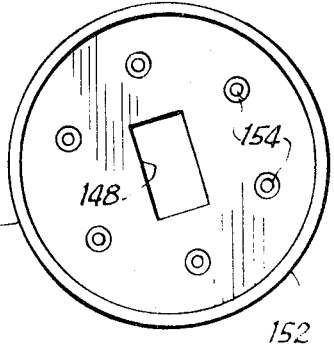
FIG. 9
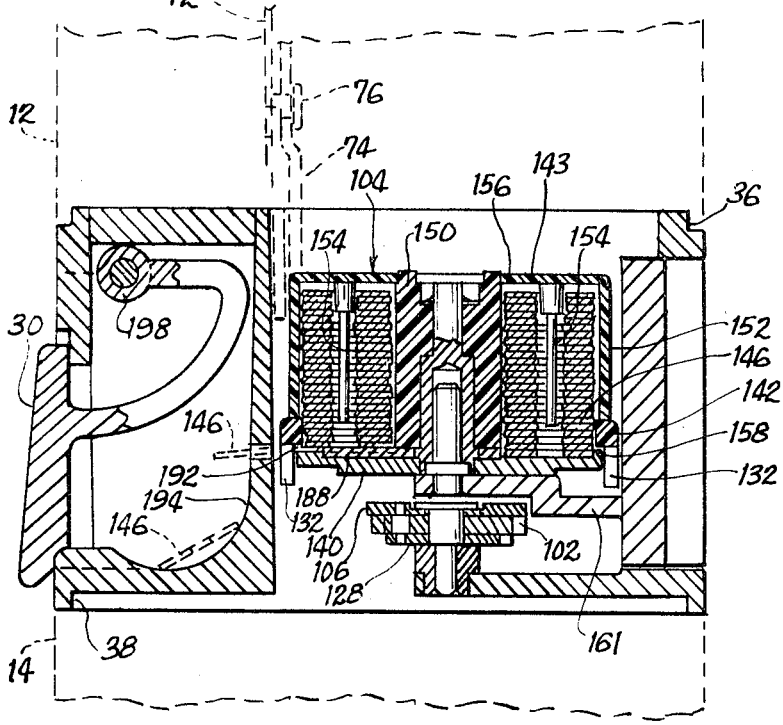
FIG. 7
FIG. 10

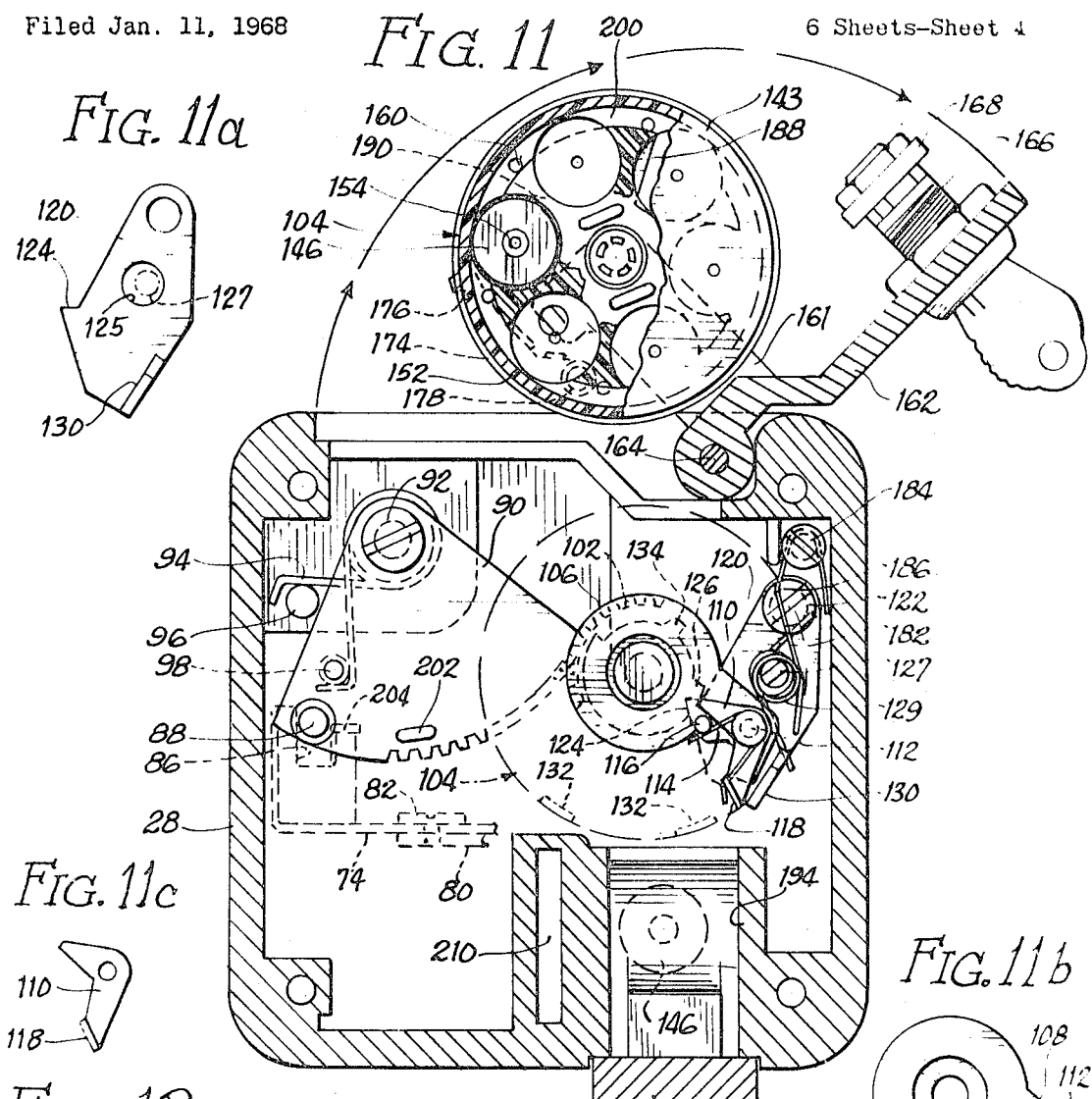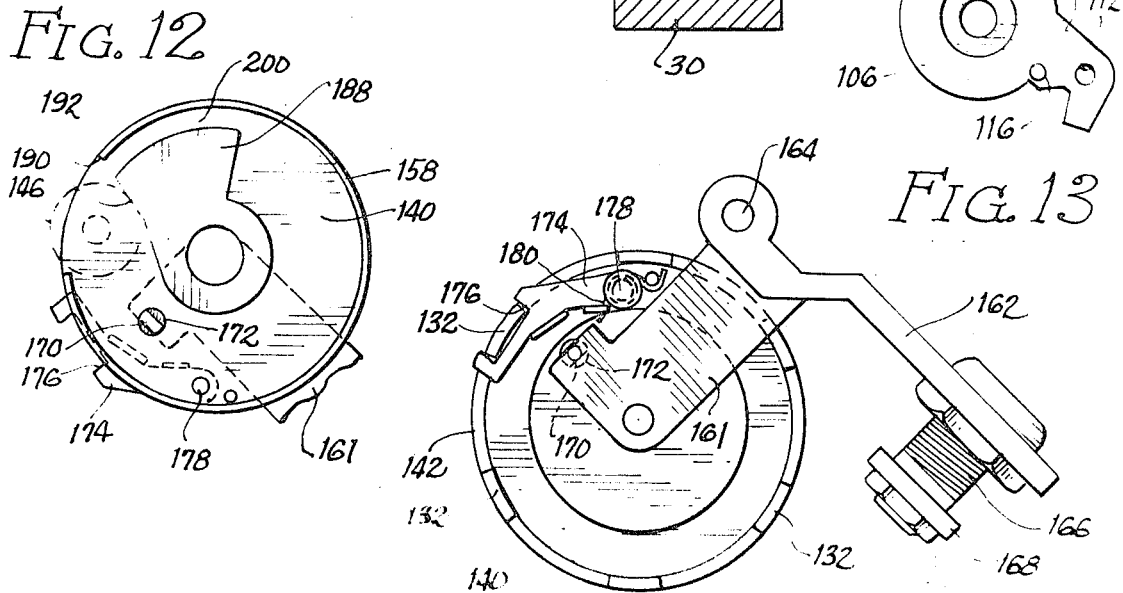

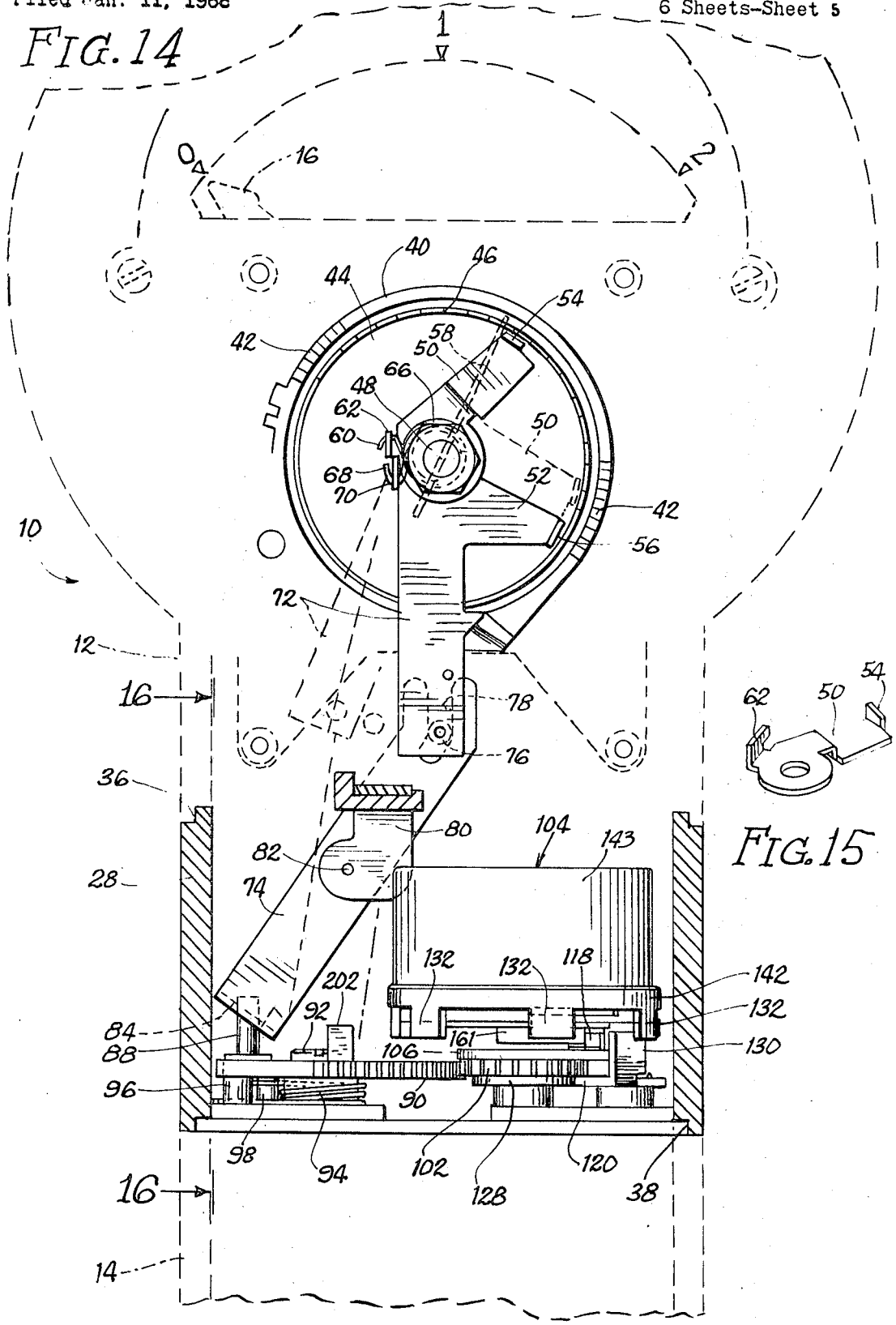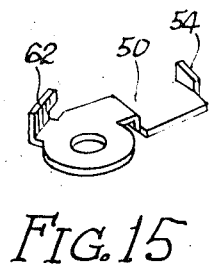

United States Patent Office 3,519,113
Patented July 7, 1970

3,519,113
PARKING METER WITH TOKEN
DISPENSING MEANS
Edward C. Arzig, Mundelein, and Rinaldo Sciacero,
Arlington Heights, Ill., assignors to Duncan Parking
Meter Corporation, Elk Grove Village, Ill., a corporation of New York
Filed Jan. 11, 1968, Ser. No. 697,118
Int. Cl. G07f 11/00; B65g 59/00
U.S. Cl. 194—2
15 Claims

ABSTRACT OF THE DISCLOSURE

A parking meter having a token dispensing magazine included within its housing, said magazine being driven directly from the time setting mechanisms for the meter whereby tokens can be dispensed in accordance with the amount of time recorded on the meter. The drive mechanisms are located immediately beneath the time setting mechanisms, and they include a vertically movable drive member and means for translating the vertical movement to rotary movement of the token magazine with the tokens being forced out of the magazine in response to the rotary movement. The discharge of the tokens is accomplished by pushing the tokens one at a time against an inclined ramp where the tokens can be forced through an opening in a side wall of the magazine.

---

The invention relates to parking meter constructions, and it is particularly directed to parking meters of a type adapted to dispense tokens.

Means for dispensing of tokens from parking meters have previously been disclosed. Thus, U.S. Pat. No. 2,070,445 provides a parking meter construction wherein tokens in the form of tickets were dispensed when money was inserted in the meter and the time set thereon. In the particular structure described in this patent, the tokens were in the form of a small ticket, and the tickets were designed to provide a receipt for the money inserted in the meter. Such receipts were then redeemable in cash or trade at a store adjacent the location of the meter. In addition, it was contemplated that the tickets could be employed for safety slogans, advertising, or for purely informational purposes.

One difficulty involved with such meters concerned the inability of the meters to store a sufficient number of tokens within a reasonably small space. Thus, it is desirable to provide a large number of tokens to minimize the maintenance necessary for the meter operation. On the other hand, it is desirable to maintain the meters as small as possible to hold costs down and to maintain as neat an appearance as possible.

Carroll and Edington Pats. Nos. 3,208,573 and 3,212,- 614 provide constructions which permit the storing of substantial numbers of tokens within a relative small space. A magazine defining a plurality of vertical bores can be filled with tokens, and a dispensing disc is associated with the construction whereby tokens can be successively removed from the bores. With this arrangement, the dispensing discs will be continuously replenished with tokens as long as some tokens remain in the magazine.

Sollenberger Pat. No. 3,272,299 also discloses a token dispensing meter construction. This construction is particularly designed so that tokens will be dispensed even if unelapsed time remains on the meter, for example where the unelapsed time is insufficient for the individual parking his car, in which case the individual will deposit money to add time to the meter. In some prior art arrangements, a token would not be dispensed unless a complete stroke of the time indicating means took place, which, of course, would not occur if unelapsed time were on the meter. This can lead to dis-satisfaction among individuals using the meters which would be totally objectionable to tradesmen depending upon the token dispensing concept to attract customers.

The instant invention is directed to still further improvements in token dispensing meters. In particular the invention provides token dispensing meters which are reliable in operation, which require minimum maintenance which can be easily manufactured, and which have a highly satisfactory appearance. A particular advantage of the invention relates to the use of a token dispensing kit which can be readily incorporated into existing meter designs without requiring any significant changes in the standard operation of the meters, and without detracting from the appearance of the meters.

Other objects and advantages of this invention will appear hereinafter, and for purposes of illustration, but not of limitation, specific embodiments of the invention are shown in the accompanying drawings in which:

FIG. 6 is a cross-sectional view taken approximately midway between the sections of FIGS. 4 and 5;

FIG. 7 is a cross-sectional view taken about the line 7—7 of FIG. 6;

FIG. 8 is a bottom view of the token magazine utilized in the construction;

FIG. 9 is a bottom view of the magazine cover;

FIG. 10 is an enlarged fragmentary view illustrating a token supporting shaft of the type included within the bores defined by the magazine;

FIG. 11 is a cross-sectional view illustrating the positioning of the magazine during loading and unloading along with the drive mechanisms for rotating the magazine;

FIGS. 11A through 11C illustrate drive components for the magazine;

FIG. 12 is a detailed plan view illustrating the token ejector plate and supporting structure;

FIG. 13 is a bottom view illustrating the magazine supported on a hinged bracket;

FIG. 14 is a vertical sectional view taken about the line 14—14 of FIG. 4;

FIG. 15 is a detailed view of one coin actuated arm associated with the time setting mechanisms;

This invention covers a token dispensing construction which can be incorporated into existing parking meters or into new parking meters which otherwise comprise conventional mechanisms. The construction of this invention, which will be generally referred to as a token dispensing kit, does not require a substantial rearrangement of parts or the introduction of a large number of new mechanisms into the conventional parking meter designs. Furthermore, the kit can be included in the existing designs without impairing their appearance.

The token dispensing kit involves the use of a magazine for carrying a large number of tokens. The magazine is indexed in the course of the parking meter operation whereby the tokens will be automatically and uniformly dispensed from the token bores defined by the magazine. A variety of different elements are associated with the construction which will insure efficient handling of the magazine prior to loading and which provide for proper alignment of the magazine during loadings so that these operations can be conducted by unskilled personnel without difficulty. During operation of the token dispensing mechanisms, control features are provided which insure the discharge of the proper number of tokens and which insure setting of the magazine in proper alignment for the succeeding operation.

All of the token dispensing functions are controlled by the time setting mechanisms of the meter. The operation insures that tokens will be dispensed in accordance with the denomination of the coin or coin-like device inserted in the meter. Thus, the operation is not dependent upon the amount of unelapsed time available.

Figure 1:
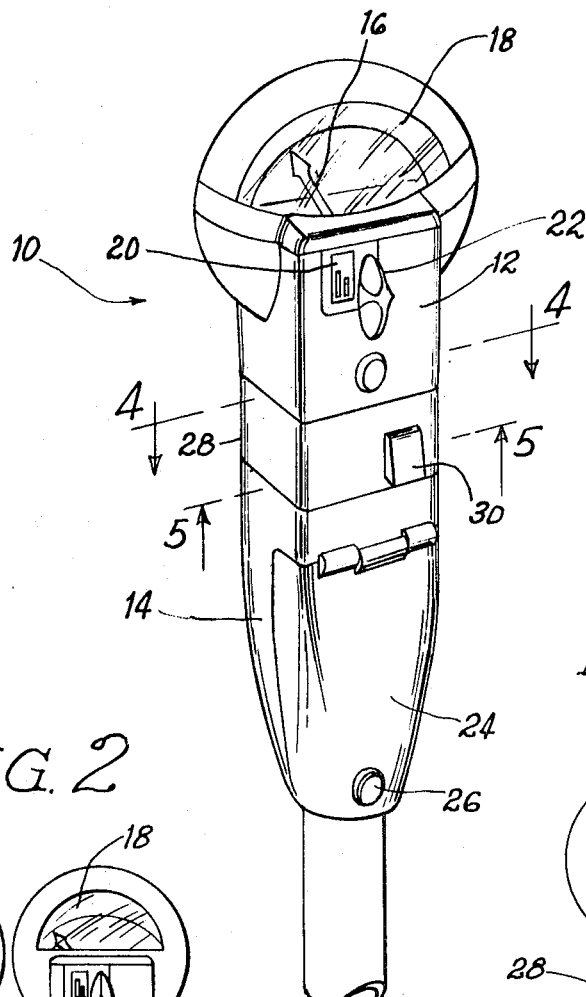
FIG. 1 is a perspective view of a parking meter construction characterized by the features of this invention.

FIG. 1 illustrates a parking meter 10 comprising an upper housing 12 for time setting mechanisms and a lower housing 14 comprising the coin box housing. Pointer 16 can be viewed through window 18 for purposes of determining the unelapsed time on the meter. The meter is provided with coin slots 20 and actuating handle 22. The coin box housing 14 includes a door 24 which can be opened by means of the lock 26 to provide for removal of accumulated coins.

The token dispensing kit of this invention is included within housing 28 located intermediate the housings 12 and 14. A hinged door 30 is provided for access to tokens which are dispensed.

Figure 2:
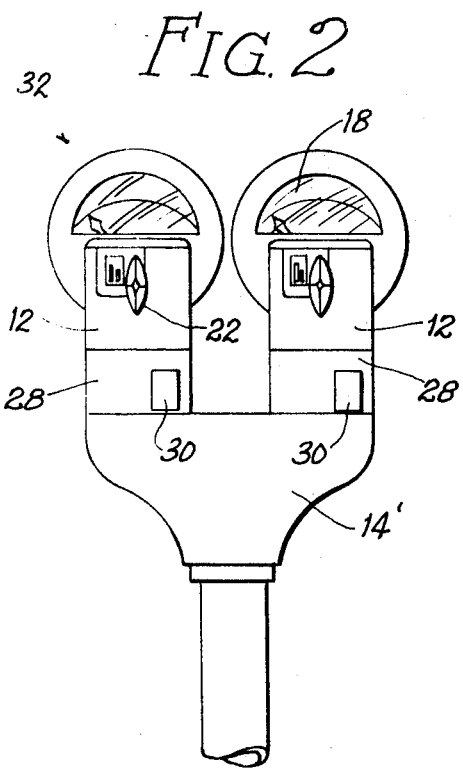
FIG. 2 is a front elevation of a duplex meter construction having token dispensing means associated therewith.

The meter 32 shown in FIG. 2 is a so-called duplex meter which includes a pair of housings 12 for the time setting mechanisms, and a common housing 14' for a coin box. The token dispensing kits 28 are located between the housing 12 and the housing 14'.

Figure 3:
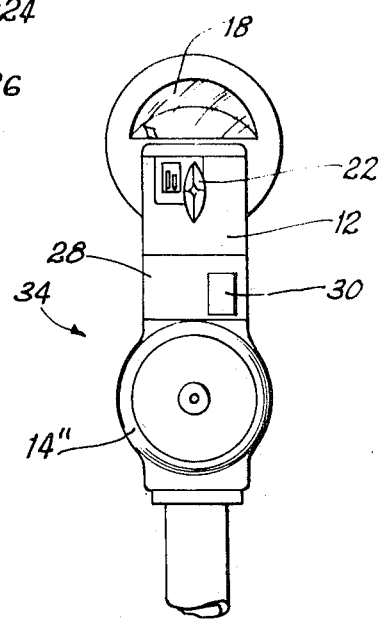
FIG. 3 is an elevational view of an additional meter design having token dispensing means incorporated therein.

The meter 34 shown in FIG. 3 also includes a housing 12 for the timing mechanisms and a coin box housing 14''. The kit 28 is again interposed between these two housings.

The meters illustrated in FIGS. 1 through 3 are known as Duncan meters; however, the concepts of this invention are not necessarily limited to meters of this design. The invention will be specifically described with respect to the meter shown in FIG. 1; however, the manner in which the token dispensing mechanisms could be incorporated in other meters will be obvious to those skilled in the art.

FIG. 14 illustrates the internal relationship of the token dispensing mechanisms relative to the conventional meter mechanisms. The kit housing 28 is provided with annular shoulders 36 and 38 which mate with complementary shoulders of the upper housing 12 and lower housing 14, respectively. All of the housings define hollow interiors for receiving the various mechanisms.

The timing mechanism comprises a stationary ratchet 40 defining teeth 42. A winding ring 44 is located within the stationary ratchet, and this ring defines teeth 46. Both the ratchet 40 and the ring 44 are mounted co-axially with central shaft 48.

The meter operation is described in detail in Pats. Nos. 1,799,056 and 2,070,445. Briefly, in such operations, a coin is inserted through a slot 20, and this coin is received by a coin carrier. The actuating handle operates to turn the coin carrier about the shaft 48, and a first pawl (not shown) associated with the coin carrier rides in engagement with the teeth 42. This pawl is urged into engagement with the teeth because of the presence of the coin in the coin carrier. The pawl is, however, spring loaded so that it can rise and fall as it moves relative to the teeth 42. This arrangement prevents return movement of the coin carrier in the event that the individual operating the meter should release the handle 22 before completing the time setting operation.

The presence of a coin in the coin carrier also operates to displace a second pawl at a particular point in the course of movement of the carrier, this operation usually resulting from engagement of the coin with a camming element. Where the meter handles coins of a single denomination, the displacement of the second pawl will occur at the same point of rotation of the coin carrier in all instances. Where plural denominations are handled, a corresponding number of camming elements are provided and the displacement will occur at different points. In any event, the second pawl engages the teeth 46 defined by the winding ring 44, and since the winding ring controls the purchased time, the point of pawl displacement is directly related to the purchased time.

In accordance with the illustrated embodiment of this invention, the token dispensing mechanisms are actuated by the second pawl on the coin carrier. Specifically, lever mechanisms 50 and 52 are mounted about the axis 48, and these mechanisms include pawl engaging projections 54 and 56, respectively. The projections 54 and 56 are located immediately adjacent the teeth 46, and if the second pawl is in a position to engage the teeth 46 when it moves past either of the projections, then this second pawl will also engage a projection. Accordingly, when a coin is inserted in the meter, the second pawl will be moved into position to engage one of the teeth or projections 54 and 56 whereby the second pawl will operate to move the winding ring 44 as well as either or both of the levers 50 and 52.

FIG. 14 illustrates in phantom a pawl 58 which is in engaging relationship with respect to the projection 54. In this instance, it will be assumed that the projection 54 will be engaged by the pawl 58 when a dime has been inserted in the meter. It will also be assumed that the meter is a two-hour meter operating at the rate of five cents per hour. The pawl 58 will move about the axis 48 in clockwise direction during the time setting and token dispensing operation.

If a dime has been inserted, the pawl 58 will operate to move the lever 50 clockwise while also rotating the winding ring 44 in a clockwise direction. The lever 50 is secured around the shaft 48 by means of a spring 60. One end of this spring is connected to the tab 62 formed at the end of the lever 50, and the intermediate portion 66 of the spring extends around the shaft 48. The opposite end 68 of the spring is connected to a tab 70 formed on the lever 52. This spring normally holds the levers 50 and 52 in the spaced apart relationship shown; however, when the lever 50 is engaged by the pawl 58, the lever 50 will move toward the lever 52.

The lever 50 moves into engagement with the lever 52 as shown in dotted lines in FIG. 14. Continued rotation of the pawl 58 results in simultaneous movement of the levers 50 and 52. This causes the actuating arm 72 of the lever 52 to pivot in a clockwise direction as shown in dotted lines. It will be apparent, therefore, that the lever arm 72 is characterized by oscillating movement, that is, clockwise movement in response to the driving action of the pawl 58, and counterclockwise movement upon its return. The return movement of the lever arm occurs at the end of the stroke of the time setting operation at which time the coin will fall from the coin carrier thereby permitting return movement of the pawl 58 to release the levers 50 and 52.

Figure 16:
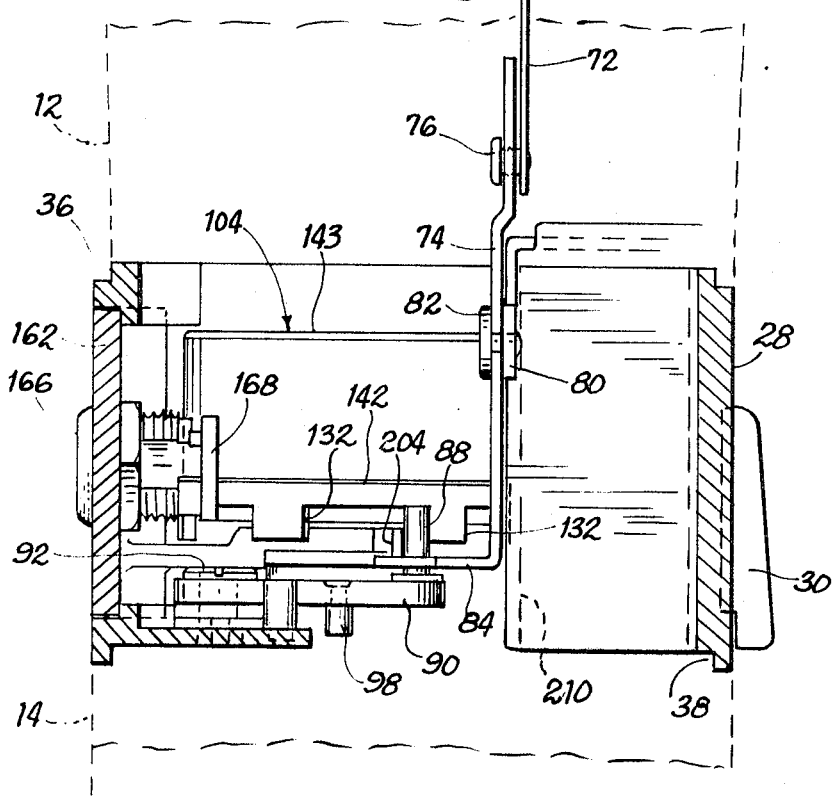
FIG. 16 is a fragmentary vertical sectional view taken about the line 16—16 of FIG. 14.
Figure 17:
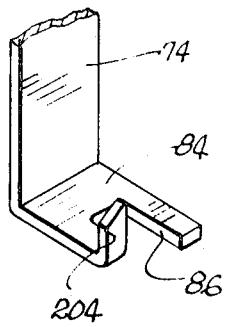
FIG. 17 is a fragmentary view of a stop mechanism preventing over-riding of the magazine.
Figure 18:
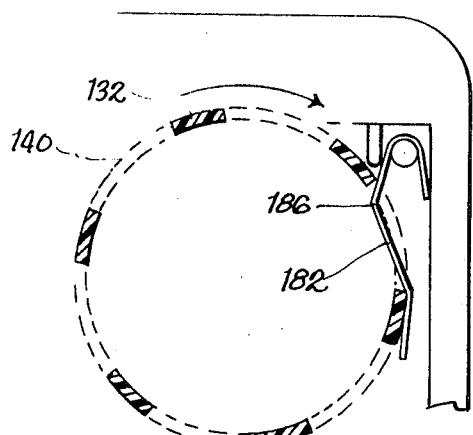
FIG. 18 is a detailed view illustrating a centering device for the magazine; and, FIG. 19 is a detailed sectional view taken about the line 19—19 of FIG. 4.
Figure 19:
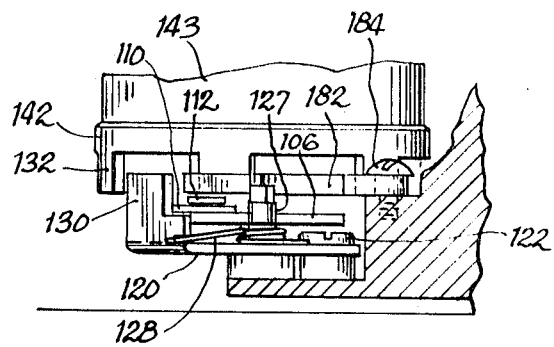

An arm 74 is attached to the lever arm 72 by means of pin 76 which is received in the slot 78 defined at one end of the arm 74. A bracket 80 serves as a support for the pivot pin 82 of the arm 74 (see FIGS. 14 and 16).

Figure 4:
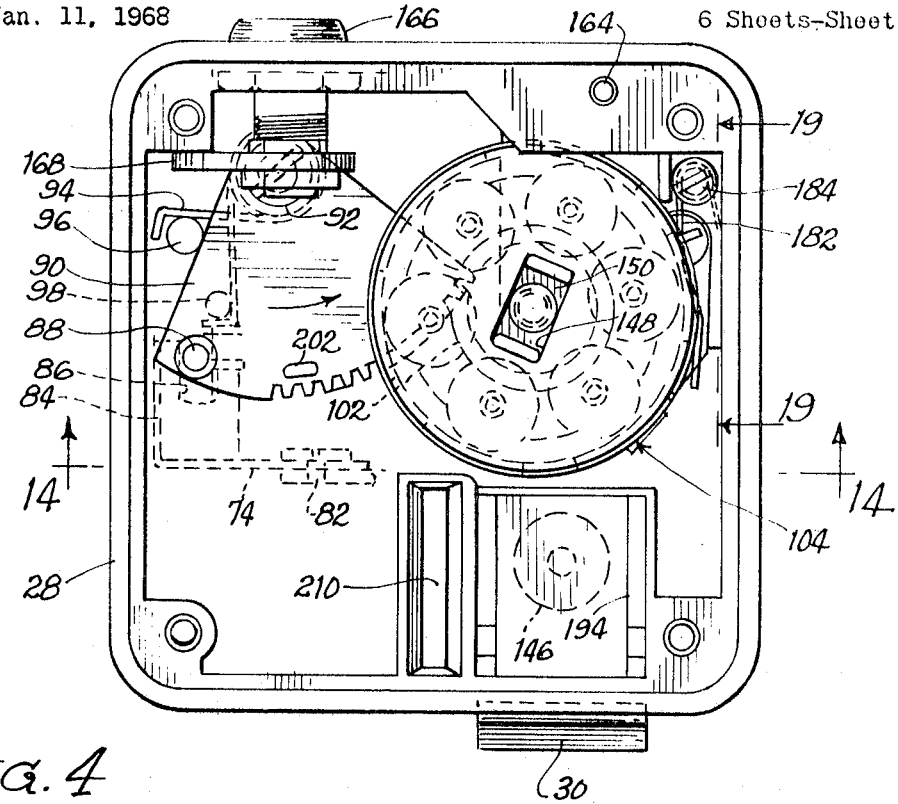
FIG. 4 is a cross-sectional view taken about the line 4—4 of FIG. 1.
Figure 5:
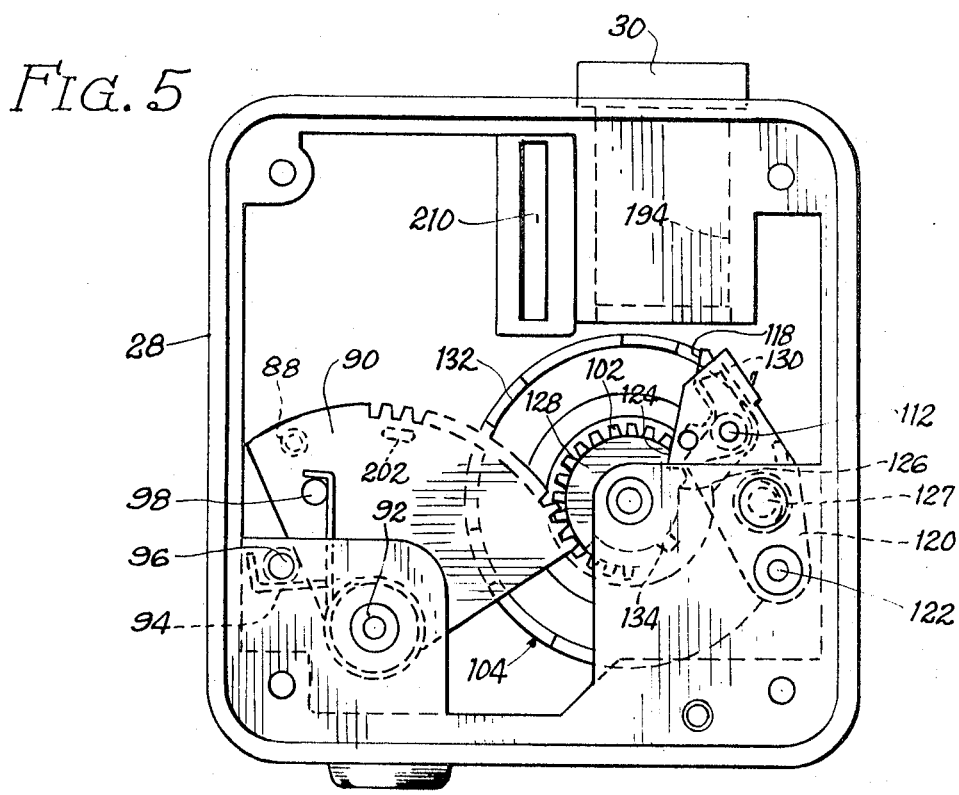
FIG. 5 is a cross-sectional view taken about the line 5—5 of FIG. 1.

The lower end of the arm 74 includes an inturned portion 84 which defines a slot 86 for receiving the post 88. The post 88 is mounted on quadrant gear 90, and this gear is pivotally connected to the screw 92. A spring 94 is wrapped around this screw with one end of the spring engaging the pin 96, and the other end of the spring engaging the pin 98. The pin 98 is attached to the quadrant gear 90, and, therefore, movement of the gear in the direction of the arrow 100 is opposed by the spring 94. Accordingly, when the lever arm 72 is shifted as shown in FIG. 14, the arm 74 will operate to rotate the quadrant gear 90 in opposition to the spring 94. When driving engagement of the lever arm 72 is removed, the action of the spring 94 will return the quadrant gear to the position shown in FIG. 4, therefore, resetting the arms 74 and 72 in the solid line positions shown in FIG. 14.

Referring back to FIG. 14, it will be appreciated that the insertion of a nickel in the meter will also result in movement of the lever 72. In this instance, however, the pawl 58 will be moved to ratchet engaging position by the coin only after the projection 54 is by-passed. Thus, the pawl 58 will directly engage the projection 56; however, in this instance, the stroke of the lever 72 will be smaller; as suggested by the intermediate dotted line showing of FIG. 14. Accordingly, a shorter stroke will be imparted by the arm 74 to the quadrant gear 90.

The quadrant gear meshes with the gear 102 which is mounted co-axially with the token magazine 104 (FIGS. 4, 5, 7, 11 and 14). Located immediately above the gear 102, and tied to the gear for movement therewith, is a bracket element 106 (FIG. 11B). The element 106 is provided with an arm 108 which carries magazine driving pawl 110 (FIG. 11C). The driving pawl is pivotally connected to the arm 108 at 112, and a spring 114 extends from the post 116 around the pivot point 112 and into engagement with the driving edge 118 of the pawl 110. This arrangement normally holds the pawl in the driving position shown in FIG. 11; and permits resetting of the drive means after the completion of a driving stroke.

A stop element 120 is pivotally connected to the housing at 122. The element 120 includes a point 124 which normally extends into engagement with lug 126 formed on disc 128. As shown in FIG. 14, this disc is located immediately beneath the gear 102.

The element 120 also includes an upstanding projection 130, which as shown in FIG. 14, is normally positioned in the path of teeth 132 defined by the bottom of the magazine 104. This projection 130 prevents movement of the magazine; however, when the quadrant gear 90 operates to rotate the gear 102, the disc 128 will also rotate thereby pivoting the element 120 to free the tooth 132 for movement past the projection 130. It will be appreciated that as soon as the point 124 on the element 120 rides past the lug 126, the projection 130 will again move into stopping position. Accordingly, the projection 130 will prevent overrun of the magazine which can occur due to the momentum forces which will result in the operation.

The element 120 is provided with an over-sized hole 125 which receives post 127. A spring 129 is wrapped around this post, and one end of the spring presses against the pivot member 122 while the other end of the spring engages the projection 130. This arrangement normally maintains the projection in a blocking position; however, the over-sized hole permits shifting of the element 120 in response to the action of the lug 126.

A second lug 134 is formed on the disc 128 whereby the projection 130 will again move out of blocking position in the event that the magazine is to be rotated by an additional amount. As will be explained, when a single token is to be dispensed, the magazine will index by an amount approximating the distance between adjacent teeth 132. A double index would occur where two tokens are to be dispensed, and at this point, it is to be noted that the driving mechanisms can obviously be modified to provide for the dispensing of different multiples of tokens. Thus, the mechanical principles of this invention are not limited to the dispensing of one or two tokens since duplication of these principles will provide for additional driving action.

The actual driving action of the magazine is imparted by the driving edge 118 of the pawl 110. As best shown in FIGS. 11 and 14, this driving edge will engage the teeth 132 when the gear 102 is rotated. The edge 118 is normally positioned a short distance behind the immediately adjacent tooth 132 so that the initial rotation of the gear will result in clearing of the projection 130 before the edge 118 begins moving the magazine.

The magazine 104 comprises a bottom plate 140, main magazine section 142 and cover 143. The main magazine section defines the teeth 132 which extend around the outer edge of the magazine section 142. In addition, a plurality of bores 144 are defined by the magazine section, and these bores receive the bottom portion of the stack of tokens 146 (FIG. 8).

The cover 143 defines a rectangular opening 148 which receives the rectangular central portion 150 of the magazine section. This arrangement ties the cover to the magazine section for movement therewith. The side walls 152 of the magazine section extend downwardly into engagement with the upper edge of the magazine section. Pins 154 are carried by the top wall 156 of the cover, and these retain the tokens 146 in proper alignment within the magazine.

The plate 140 defines an annular shoulder 158 which engages the bottom surface of the magazine section 142. This retains the plate and magazine section in spaced apart relationship whereby the bottom token in the stacks will rest on the plate without being confined by one of the bores 144. This arrangement permits removal of a token from a stack for dispensing purposes when relative movement takes place between the magazine and plate. A pin 160 is associated with each of the bores 144, and these pins extend downwardly from the bottom surface of the magazine into near engagement with the upper surface of the plate 140. These pins serve to push tokens over the plate 140 during relative rotation.

The magazine 104 is mounted on a bracket 161 which is secured to door 162 formed in the housing 28. The door is hinged to the housing at 164, and a lock 166 includes latching member 168 which secured the door with respect to the housing.

The bracket 161 defines a pin 170 which is dimensioned to be received in the opening 172 defined by the plate 140. When an assembly including the plate 140, magazine 142, and cover 143 is placed on the bracket 161, the combination of the pin 170 and opening 172 serves to accurately align the assembly relative to the bracket.

The assembly is designed so that it can be efficiently handled after it is loaded with tokens. During loading, the cover 143 can be inverted, and the tokens stacked by placing them over the pins 154. The magazine 142 and plate 140 are then located in place. A locking arm 174 is attached to the bottom of the plate 140. This arm includes a recess 176 which receives one of the teeth 132 when the plate and magazine are in the assembled relationship. It will be apparent that this will prevent rotation of the plate relative to the magazine.

The locking arm 174 is pivotally mounted at 178, and a spring 180 holds the rocking arm in the locking position shown in FIG. 13. The locking position will be maintained until the door 162 is closed after a loaded magazine is placed on the bracket 161. The unlocking action takes place when the arm 174 is moved against the post 127. The locking arm is illustrated in the unlocked position in FIG. 6.

A centering spring 182 is mounted adjacent one wall of the housing 28. One end of the spring is fitted around a post 184, and, when the door 162 is open, the other end of the spring presses against the turns of the spring 129 (FIG. 11). When the door is closed, however, the bend 186 will fit between adjacent teeth 132 to thereby serve as a device for accurately positioning the magazine relative to the plate 140 as soon as the locking arm 174 is released. Furthermore, the spring 182 will center itself with respect to adjacent teeth 132 at the completion of each indexing operation. Therefore, there will be teeth 132 in the same positions at the completion of each indexing operation. The spring 182 will yield and ride over the teeth during the driving of the magazine.

The plate 140 defines an ejector element 188 which may be formed integrally on the upper surface of the plate or which may comprise a separate piece rigidly attached to this upper surface of the plate. In the arrangement illustrated, the element is received in a recess defined by the plate 140 (FIG. 7).

The element 188 defines a token engaging surface 190 which functions as a ramp for directing tokens 146 through the opening 192 which is defined in the shoulder 158. When the tokens have passed through the opening 192, they are deposited in the token receptable 194. The door 30 provides access to the tokens, this door being hinged to the housing as illustrated at 198 in FIG. 7.

In the operation of a token dispensing meter of the type described, the magazine 104 is first loaded in the meter by placing it on the bracket 161. The door 162 is then closed and locked, and at this time, the arm 174 will unlock to free the magazine for the dispensing operation. Since the position of the magazine is set due to the receipt of the pin 170 in the opening 172, the magazine will automatically be in position for dispensing movement. The centering spring 182 also serves to set the position of the magazine in proper relationship with respect to the drive mechanisms.

The token dispensing operation takes place when a coin is deposited in the meter, and the coin carrier with associated pawl 58 is turned. If the coin is a nickel, the pawl 58 will be moved into ratchet engaging position after the projection 54 has been by-passed. In the case of a dime, the pawl 58 will engage the projection 54. However, in either case, the lever 52 and its associated arm 72 will be pivoted as shown in FIG. 14.

The pivoting action is imparted to the arm 74, and this in turn results in the movement of the quadrant gear 90. This movement results in the rotation of the gear 102 whereby the projection 130 will be moved out of blocking position, and whereby the driving edge 118 will move into engagement with a tooth 132.

At the time the indexing movement begins, one token will be in position adjacent the ramp 190 of the ejector element 188. In the case of a nickel, this token will be forced through the opening 192 while all stacks of tokens are indexed in one position. This will result in the placement of a new token adjacent the opening 192. One stack will always be positioned over the element 188; however, the bottom token in this stack will drop onto the upper surface of the plate 140 as soon as the stack is indexed past the plate. With this arrangement, each of the stacks will contribute a token in sequence whereby the stacks will be uniformly depleted.

The pins 160 secured to the bottom of the magazine 142 operate to move the tokens along during the indexing operation. A passage 200 is defined between the shoulder 158 and the element 188 (FIG. 12) so that the pins will not engage the ejecting ramp.

As indicated, the magazine is relatively heavy, and since the ejecting operation involves relatively rapid movement on the part of the magazine, the magazine will build up considerable momentum. The projection 130 and centering spring 182 function to reduce the chance of overrun. Thus, the projection 130 will move back into blocking position as soon as the previously blocked tooth has passed. The spring 182 imparts a drag which will help to reduce momentum as soon as the driving force is released.

An additional safeguard against over-run is provided by means of stops which are formed on the quadrant gear 90, and on the pivotal arm 74, respectively. The first stop 202 extends upwardly from the quadrant gear for engagement with a tooth 132 after the quadrant gear has imparted the driving action sufficient to eject one token. FIG. 6 illustrates the manner in which the stop 202 moves into the path of the teeth 132 when the quadrant gear has moved by the designated amount.

When a dime is inserted in the meter, two tokens are ejected and, therefore, the quadrant gear must drive the gear 102 by an additional amount in order to provide for a second ejecting operation. The additional movement of the quadrant gear is, of course, accomplished when the lever 50 is moved by the pawl 58 into engagement with the lever 52, and when continued movement moves the lever arm 72 to the extreme position shown in FIG. 14.

When the quadrant gear is moved by this additional amount, the stop 202 moves past the line of travel of the teeth 132 wherein it can no longer function as a stop member. In this case, however, the arm 74 is pivoted by an additional amount whereby the stop 204 defined by the arm 74 will move into the path of travel of the teeth 132. There is, therefore, provided a highly reliable arrangement for preventing over-run whereby the exact number of tokens will be dispensed during each operation.

The drive mechanisms are reset in response to the return movement imparted to the quadrant gear by the spring 94. During the return movement, the spring mounted pawl 110 will ride over the teeth 132 until the pawl resumes its original position.

It is important to note that the dispensing of a token is solely dependent upon the movement of the levers 50 and 52 and is not dependent upon the movement of the winding ring 44. Even if only a small amount of unelapsed time or no unelapsed time remained on the meter, the insertion of a coin and turning of the handle will result in engagement of the levers by the pawl 58. In such instance, the pawl 58 will not engage the teeth 46 or will engage a tooth only near the end of the pawl travel; however, the pawl will always pick up the levers at the same position.

The normal spacing between the levers 50 and 52 is determined by the engaging tabs 62 and 70 and the associated spring 60 as shown in FIG. 1. This spacing can be varied by varying the dimensions of the tabs or lever ends and an additional spaced levers could also be added. These variations will, of course, be necessary where different coin-time relationships are required or where token dispensing capabilities are to be changed. It is also noted that a lever could be eliminated if the dispensing of only one token per coin is all that is necessary.

It will be apparent that the distance between the bottom edge of the bores 144 and the top surface of the plate 140 must be carefully controlled so that one token will be dispensed during each indexing movement. Furthermore, the thickness of the edge 190 which is exposed above the surface 140 must be carefully controlled. Thus, the thickness must be sufficient to engage the bottom token in a stack while at the same time permitting the next token to slide over the top edge of the plate 188. Obviously, the spacing between the magazine 142 and the plate 140 could be increased so that two or more tokens could be accommodated and with a corresponding increase in the thickness of the plate 188, two or more tokens could then be discharged simultaneously.

In referring to "coins" it will be understood that coin substitutes are contemplated for insertion in the meter.

The tokens illustrated have a washer configuration, however, this is not necessary to the operation of the dispenser. The washers provide certain advantages, however, in that they decrease the likelihood of the tokens becoming jammed. As shown in FIG. 10, the tokens are essentially unconfined in the area of the stack above the bores 144 so there is minimum contact with side walls which would tend to cause the tokens to hang-up. The presence of the pins 154 also prevents the tokens from assuming a tilt which differs greatly from the horizontal.

The use of the "kit arrangement" is highly advantageous since this permits the construction of token dispensing meters without the necessity for any drastic changes in conventional meter designs. In the case of the meters illustrated in FIGS. 1, 2 and 3, the only major modifications necessary involve the addition of the lever mechanisms on the shaft carrying the winding ring. The housing 28 is inserted between the upper and lower housing sections without the necessity for any significant modifications in these sections. For example, the coin passage extending from the upper section to the coin box in the lower section will remain in the same position with an additional passage section being provided as shown at 210 in FIGS. 4 and 5. This passage section can communicate directly with the coin passages provided in the conventional constructions.

The arrangement illustrated is also of great advantage from an aesthetic standpoint. The addition of the token dispensing kit merely adds to the vertical dimension of the meters, and does not involve any laterally disposed sections which might prove unsightly. The particular drive mechanisms described are responsible for this result since the levers and operating arms extend straight down but are designed to impart rotary movement to the quadrant gear and magazine even though these latter elements move in a horizontal plane.

It will be understood that various changes and modifications may be made in the above described constructions which provide the characteristics of this invention without departing from the spirit thereof particularly as defined in the following claims.

That which is claimed is:

1. In a token dispensing parking meter wherein tokens are dispensed by the meter after the insertion of coins for setting of time on the meter, said meter including time setting mechanisms operable when coins have been inserted in the meter, the improvement comprising means capable of dispensing a plurality of tokens in response to the operation of said time setting mechanisms, the number of tokens depending upon the denomination of the coins inserted, said means comprising at least first and second levers, a token holding means, means for transmitting token dispensing action to said token holding means in response to movement of said levers, means mounting said levers for movement in response to engagement by said time setting mechanisms, engagement of said first lever operating to move the first lever toward said second lever and wherein the second lever is thereafter engaged with continued movement of said time setting mechanisms transmitting said token dispensing action to said token holding means.

2. A parking meter according to claim 1 including a driving pawl associated with said time setting means adapted to be forced into driving position when a coin has been inserted in said meter, and means for rotating said pawl relative to said levers whereby said pawl is adapted to drivingly engage the second lever when a coin of lesser denomination is inserted, and is adapted to engage said first lever when a coin of greater denomination is inserted and to then move said first lever toward said second lever to provide for driving engagement of said second lever.

3. In a token dispensing parking meter wherein tokens are dispensed by the meter after the insertion of a coin for setting of time on the meter, the improvement in means for carrying out dispensing of the tokens comprising an assembly including a magazine section for holding at least one stack of tokens and a bottom plate defining an upper surface supporting the bottommost token in a stack, an ejector element fixed in a stationary position relative to said plate and defining a token engaging ramp, and including means for driving tokens relative to said ramp whereby at least one token at a time is moved into engagement with said ramp, said ramp operating to direct said tokens off said bottom plate to thereby dispense the tokens from said assembly, said driving action occurring in response to the actuation of mechanisms employed for setting time on the meter, and wherein said magazine section comprises a lower section defining a plurality of bores, a stack of tokens being supported in axial alignment with each of said bores, the bottom of each of said bores being disposed in spaced apart relationship relative to said upper surface with the spacing being at least as great as the thickness of a token, and including pusher means extending downwardly from said magazine section for engaging the tokens located on said upper surface to thereby move the tokens toward said ramp in response to said driving action, a cover for said assembly, said cover comprising a cylindrical member having a top wall and a downwardly extending side wall, said side wall extending into engagement with said lower magazine section with said stacks of tokens extending upwardly into said cover, said tokens being in the form of washers defining central openings, and including a plurality of pins connected to and extending downwardly from the top wall of said cover, said pins extending within each stack of tokens whereby the pins serve to maintain the tokens in individual stacks.

4. A parking meter in accordance with claim 3 wherein said ejector element extends upwardly from said upper surface, and wherein said ramp comprises an edge portion of said ejector element located in the path of movement of said tokens.

5. A parking meter in accordance with claim 4 including an upstanding rim defined by said bottom plate normally confining said tokens on said bottom plate, and an opening defined by said rim adjacent the location of said ejector element whereby tokens engaged with said ramp are adapted to be forced through said opening for ejection from the assembly.

6. A parking meter according to claim 3 including a centering means located immediately adjacent the side wall of said magazine section, said centering means comprising a spring pressing against said magazine section, said magazine section including a plurality of openings corresponding to indexing positions for the dispensing of tokens, and said spring means including a projecting portion adapted to press into one of said openings at the conclusion of each indexing movement of said magazine section whereby said centering means will provide precise stopping positions for the magazine section after each indexing movement.

7. In a token dispensing parking meter wherein tokens are dispensed by the meter after the insertion of a coin for setting of time on the meter, the improvement in means for carrying out dispensing of the tokens comprising an assembly including a magazine section for holding at least one stack of tokens and a bottom plate defining an upper surface supporting the bottommost token in a stack, an ejector element fixed in a stationary position relative to said plate, and including means for driving tokens relative to said ejector element whereby at least one token at a time is moved into engagement with the element, said element operating to direct said tokens off said bottom plate to thereby dispense the tokens from said assembly, and wherein said driving action occurs in response to the actuation of mechanisms employed for setting time on the meter, said bottom plate being maintained in a stationary position with said magazine section being mounted for rotation relative to said bottom plate, and including a drive gear for imparting rotary movement to said magazine section, lever means connected to said drive gear, and pawl means for driving said lever means, said pawl means having an operative driving position achieved in response to the introduction of a coin into said meter, and said pawl means being in an inoperative position in the absence of the introduction of a coin, said lever means including at least two separate lever members adapted to be separately engaged by said pawl means, said pawl means being adapted to engage one of said lever members when a coin of a lower denomination is placed in said meter to drive said one lever member only, and said pawl means being adapted to drivingly engage an additional lever member when coins of greater denomination are placed in said meter, said one lever member being located in the path of movement of said additional lever member whereby said one lever member is adapted to be engaged by said additional lever member to thereby drive said one lever member together with said additional lever member, the lever member engaged by said pawl means determining the degree of rotation of said magazine section and consequently determining the number of tokens dispensed by said magazine section.

8. A parking meter according to claim 7 wherein said magazine section defines driven teeth, said drive gear being located between said lever means and said magazine, and including teeth engaging means operatively connected to said drive gear for imparting rotary movement to said magazine section.

9. A parking meter according to claim 8 wherein said drive gear comprises a horizontally positioned quadrant gear movable back and forth about a vertical axis, and wherein said lever means include an arm extending vertically relative to said quadrant gear with the arm having a back and forth swinging movement, and including an end portion defined by said arm having driving engagement with said quadrant gear whereby the swinging movement of the arm imparts said back and forth movement to said quadrant gear.

10. In a token dispensing parking meter wherein tokens are dispensed by the meter after the insertion of a coin for setting of time on the meter, the improvement in means for carrying out dispensing of the tokens comprising an assembly including a magazine section for holding at least one stack of tokens and a bottom plate defining an upper surface supporting the bottommost token in a stack, an ejector element, and including means for driving tokens relative to said element whereby at least one token at a time is moved into engagement with said element, said element operating to direct said tokens off said bottom plate to thereby dispense the tokens from said assembly, said driving action occurring in response to the actuation of mechanisms employed for setting time on the meter, and wherein said magazine section defines driven teeth, teeth engaging means operatively connected to the drive means for imparting rotary movement to said magazine section, a stop element defining means for engaging said teeth, said stop element being normally disposed in the path of movement of said teeth, and including means for shifting said stop element out of said path of movement when said drive means begins operation.

11. In a token dispensing parking meter wherein tokens are dispensed by the meter after the insertion of a coin for setting of time on the meter, the improvement in means for carrying out dispensing of the tokens comprising an assembly including a magazine section for holding at least one stack of tokens and a bottom plate defining an upper surface supporting the bottommost token in a stack, an ejector element, means for driving tokens relative to said element whereby at least one token at a time is moved into engagement with said element, said element operating to direct said tokens off said bottom plate to thereby dispense the tokens from said assembly, and wherein said driving action occurs in response to the actuation of mechanisms employed for setting time on the meter, and wherein said magazine section defines driven teeth, teeth engaging means operatively connected to the drive means for imparting rotary movement to said magazine section, and stop means defined by said gear means for preventing overrun of said magazine section, said stop means being moved into the path of movement of said teeth at approximately the completion of the driving movement of said drive means to thereby prevent said magazine section from continuing movement when the movement of the gear means has been completed.

12. In a token dispensing parking meter wherein tokens are dispensed by the meter after the insertion of a coin for setting of time on the meter, the improvement in means for carrying out dispensing of the tokens comprising an assembly including a magazine section for holding at least one stack of tokens and a bottom plate defining an upper surface supporting the bottommost token in a stack, an ejector element, and including means for driving tokens relative to said element whereby at least one token at a time is moved into engagement with said element, said element operating to direct said tokens off said bottom plate to thereby dispense the tokens from said assembly, and wherein said driving action occurs in response to the actuation of mechanisms employed for setting time on the meter, including a pivotally mounted arm providing a portion of the drive means for said magazine section, driven teeth carried by the magazine section, teeth engaging means actuated by said arm for imparting rotary movement to said magazine section, and stop means defined by said arm, said stop means being interposed into the path of movement of said teeth at approximately the completion of the driving movement of said drive means to thereby prevent said magazine section from continuing movement when the movement of the gear means has been completed.

13. In a token dispensing parking meter wherein tokens are dispensed by the meter after the insertion of a coin for setting of time on the meter, the improvement in means for carrying out dispensing of the tokens comprising an assembly including a magazine section for holding at least one stack of tokens and a bottom plate defining an upper surface supporting the bottommost token in a stack, an ejector element, and including means for driving tokens relative to said element whereby at least one token at a time is moved into engagement with said element, said element operating to direct said tokens off said bottom plate to thereby dispense the tokens from said assembly, and wherein said driving action occurs in response to the actuation of mechanisms employed for setting time on the meter, locking means carried in association with said magazine section for preventing movement of said magazine section relative to said bottom plate, said magazine section being removable from the meter and said locking means operating automatically to provide said locking function when said magazine assembly is located outside of said meter, and including means for automatically releasing said locking means when said magazine assembly is placed in position within said meter.

14. In a token dispensing parking meter wherein tokens are dispensed by the meter after the insertion of a coin for setting of time on the meter, the improvement in means for carrying out dispensing of the tokens comprising an assembly including a magazine section for holding at least one stack of tokens and a bottom plate defining an upper surface supporting the bottommost token in a stack, an ejector element, and including means for driving tokens relative to said element whereby at least one token at a time is moved into engagement with said element, said element operating to direct said tokens off said bottom plate to thereby dispense the tokens from said assembly, and wherein said driving action occurs in response to the actuation of mechanisms employed for setting time on the meter, and including a bracket for supporting the magazine assembly in said meter, said bracket being hinged to said meter whereby it can be moved away from the operating position of said magazine assembly and exposed on the exterior of said meter to thereby facilitate insertion and replacement of magazine assemblies within the meter.

15. In a token dispensing parking meter wherein tokens are dispensed by the meter after the insertion of a coin for setting of time on the meter, the improvement in means for carrying out dispensing of the tokens comprising an assembly including a magazine section for holding at least one stack of tokens and a bottom plate defining an upper surface supporting the bottommost token in a stack, an ejector element, and including means for driving tokens relative to said element whereby at least one token at a time is moved into engagement with said element, said element operating to direct said tokens off said bottom plate to thereby dispense the tokens from said assembly, and wherein said driving action occurs in response to the actuation of mechanisms employed for setting time on the meter, said bottom plate being maintained in a stationary position with said magazine section being mounted for rotation relative to said bottom plate, and including a drive gear for imparting rotary movement to said magazine section, lever means connected to said drive gear, and pawl means for driving said lever means, said pawl means having an operative driving position achieved in response to the introduction of a coin into said meter, and said pawl means being in an inoperative position in the absence of a coin, and wherein said drive gear comprises a horizontally positioned quadrant gear movable back and forth about a vertical axis, and wherein said lever means extend vertically relative to said quadrant gear with the lever means having a back and forth swinging movement, and including an end portion defined by said lever means having driving engagement with said quadrant gear whereby the swinging movement of the lever means imparts said back and forth movement to said quadrant gear.

References Cited

UNITED STATES PATENTS

| | | | |
|---|---|---|---|
| 424,591 | 4/1890 | Batdorf | 221—113 X |
| 772,977 | 10/1904 | Townsend. | |
| 786,192 | 3/1905 | Conklin. | |
| 2,070,445 | 2/1937 | Miller et al. | |
| 2,215,850 | 9/1940 | Holdeman. | |
| 2,698,682 | 1/1955 | Bodan. | |
| 3,272,299 | 9/1966 | Sollenberger | 194—2 |
| 2,553,332 | 5/1951 | Rhodes. | |
| 2,580,400 | 1/1952 | Broussard. | |

SAMUEL F. COLEMAN, Primary Examiner

U.S. Cl. X.R.

221—113